United States Patent
Kato et al.

(10) Patent No.: US 7,766,471 B2
(45) Date of Patent: Aug. 3, 2010

(54) INK SET FOR INK-JET RECORDING

(75) Inventors: Ryuji Kato, Aisai (JP); Hisako Tonishi, Kariya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 527 days.

(21) Appl. No.: 11/845,991

(22) Filed: Aug. 28, 2007

(65) Prior Publication Data

US 2008/0079793 A1    Apr. 3, 2008

(30) Foreign Application Priority Data

Sep. 29, 2006  (JP)  ............................. 2006-267414
Jul. 24, 2007   (JP)  ............................. 2007-192147

(51) Int. Cl.
*G01D 11/00*  (2006.01)
*C09D 11/00*  (2006.01)

(52) U.S. Cl. .................. 347/100; 347/95; 106/31.13; 106/31.27; 106/31.6

(58) Field of Classification Search .................. 347/95, 347/96, 100, 101; 106/31.13, 31.27, 31.6
See application file for complete search history.

(56) References Cited

U.S. PATENT DOCUMENTS

| | | | |
|---|---|---|---|
| 6,733,120 B2 | 5/2004 | Ogasawara et al. | |
| 6,960,622 B2 | 11/2005 | Nakano | |
| 7,293,867 B2 * | 11/2007 | Ogawa et al. | 347/100 |
| 2006/0238588 A1 * | 10/2006 | Lee et al. | 347/100 |

FOREIGN PATENT DOCUMENTS

| | | |
|---|---|---|
| JP | 200382267 | 3/2003 |
| JP | 200396371 | 4/2003 |
| JP | 2003213187 | 7/2003 |

* cited by examiner

*Primary Examiner*—Charlie Peng
(74) *Attorney, Agent, or Firm*—Banner & Witcoff, Ltd.

(57) ABSTRACT

An ink set for ink-jet recording includes a black ink containing a black pigment having an average particle size of from about 100 nm to about 150 nm, and color inks containing color pigments having an average particle size of from about 60 nm to about 90 nm. The dynamic surface tension of the black ink is from about 40 mN/m to about 45 mN/m, and the dynamic surface tension of each of the yellow ink, the magenta ink and the cyan ink is from about 35 mN/m to about 40 mN/m measured on the condition of 25° C. according to a maximum bubble pressure method at lifetime of 100 ms.

18 Claims, No Drawings

INK SET FOR INK-JET RECORDING

CROSS REFERENCE TO RELATED APPLICATION

This application claims the benefit of Japanese Patent Application No. 2006-267414, filed Sep. 29, 2006, and Japanese Patent Application No. 2007-192147, filed Jul. 24, 2007, which are incorporated herein by reference in their entirety.

BACKGROUND

Pigments that are generally superior to dyes in the points of light fastness, water resistance and ozone resistance are widely used as colorants in inks for ink-jet recording. When ink-jet recording is carried out with a pigment series ink set, the dispersion stability of pigment particles may be improved to realize high ejection stability. Steps also have been taken to restrain feathering (in particular, feathering at the recorded part with a black ink) and bleeding (in particular, bleeding between the recorded part with a black ink and the recorded part with a yellow ink), and to improve color developing properties and transparency of color inks.

An ink set for ink-jet recording has been developed in which the relative size of the particle size between the pigment particles of a black ink and the pigment particles of color inks is adjusted. However, ink-jet recorded materials having good printing quality may not necessarily be obtained by mere adjustment of the relative size of the particle size between the pigment particles of a black ink and the pigment particles of color inks. Specifically, feathering and bleeding on the surface of plain paper may not be sufficiently restrained. Further, when pigment particles of color inks are large, second colors such as red, green, blue, and the like may appear dark and dull when applied to glossy paper. Unevenness in solid parts may also result. In addition, in connection with the OD (optical density) value of a black color on plain paper, a problem arises in covering power and the OD value lowers when particle size is small.

SUMMARY

An ink set for ink-jet recording has good ejection stability and may avoid feathering and bleeding on plain paper. The ink set also may have good color developing properties and transparency of color inks on glossy paper, and may avoid unevenness in solid parts on plain paper and glossy paper. Images may be formed with black ink on plain paper without lowering the OD value of the part recorded with a black ink when ink-jet recording is carried out with pigment series ink set for ink-jet recording.

One or more of the above aspects may be achieved by the selection of the particle size of the black pigment of the colorant of black ink and the particle sizes of the color pigments of the colorants of color inks, and also the dynamic surface tension of the inks.

An ink set for ink-jet recording includes a black ink containing a black pigment, a yellow ink containing a yellow pigment, a magenta ink containing a magenta pigment, and a cyan ink containing a cyan pigment. The average particle size of the black pigment may be from about 100 nm to about 150 nm, and the average particle size of each of the yellow pigment, the magenta pigment and the cyan pigment may be from about 60 nm to about 90 nm. The dynamic surface tension of the black ink measured on the condition of 25° C. according to a maximum bubble pressure method at lifetime of 100 ms may be from about 40 mN/m to about 45 mN/m. The dynamic surface tension of each of the yellow ink, the magenta ink and the cyan ink measured on the same condition and with the same method may be from about 35 mN/m to about 40 mN/m.

An ink-jet recording method includes mounting the ink set for ink-jet recording on an ink-jet printer equipped with ink-jet heads, and ejecting at least one ink constituting the ink set from the ink-jet head to a recording material according to printing data to form an image on the recording material.

The pigment series ink set for ink-jet recording may use a black pigment having a prescribed average particle size as a black ink, so that feathering may be restrained while maintaining high OD value on plain paper, and sharpened edges and good ejection stability may be secured at the same time. Color pigments having an average particle size of from about 60 nm to about 90 nm may be used in color inks other than black ink, e.g., a yellow ink, a magenta ink and a cyan ink, so that a high color developing property and transparency on glossy paper may be realized and unevenness in solid parts on plain paper and glossy paper may be restrained. Because the particle sizes of the color pigments are smaller than the particle size of the black pigment and filling effect of filling the fibers of plain paper may be expected, bleeding between the recorded part with the black ink and the recorded parts with the color inks may be inhibited. By using ink having dynamic surface tension in a prescribed range as the black ink, feathering may be further restrained. The color inks may use pigments having average particle sizes in a prescribed range which are less than the average particle sizes of the black pigment, so that color inks may penetrate a recording material faster than the black ink, thereby achieving a desirable filling effect. Moreover, bleeding may be restrained between the part recorded with the black ink and the part recorded with the color inks.

DETAILED DESCRIPTION

The ink set for ink-jet recording includes four-color pigment inks including a black ink, a yellow ink, a magenta ink and a cyan ink.

Because the black ink is often used in text printing, feathering is usually less of a factor in printing quality and an OD value is usually relatively high. A black pigment having an average particle size (diameter) of from about 100 nm to about 150 nm, often from about 120 nm to about 150 nm, may be used as the colorant in the black ink. When the average particle size of the black ink is less than about 100 nm, feathering may become conspicuous, so that the OD value may be reduced. On the other hand, when the average particle size exceeds about 150 nm, ejection stability from ink jet heads may be reduced.

Because the yellow ink, the magenta ink and the cyan ink may be often used in digital photographic image printing, they may provide good color developing properties and transparency, and the resulting images may be free from unevenness in solids parts. Therefore, as the colorants in these color inks, color pigments, e.g., a yellow pigment, a magenta pigment and a cyan pigment, each may have an average particle size of from about 60 nm to about 90 nm, and often from about 60 to about 75 nm. When the average particle size of the color pigments is less than about 60 nm, the color developing property may be reduced due to reduction of the covering power. When the average particle size exceeds about 90 nm, the color developing properties and feeling of transparency, especially for second colors such as red, green, blue, and the like, may be decreased and the resulting image may tend to look dark and dull.

The value of the average particle size of each of the pigments is a volume average value measured with a dynamic light scattering type particle size distribution meter. For example, the average particle size may be measured with a dynamic light scattering nanoparticle size analyzer LB-500 (manufactured by Horiba, Ltd.).

The dynamic surface tension of the black ink containing the black pigment having the prescribed average particle size, measured on the condition of 25° C. according to a maximum bubble pressure method at lifetime of 100 ms, may range from about 40 mN/m to about 45 mN/m, and often ranges from about 40 mN/m to about 43 mN/m. The dynamic surface tension of each of the yellow ink, the magenta ink, and the cyan ink, measured on the same conditions, may range from about 35 mN/m to about 40 mN/m, and often ranges from about 36 mN/m to about 38 mN/m.

It is known that the dynamic surface tension of a liquid such as ink and the like may be measured according to a vibration jet method, a meniscus method, a maximum bubble pressure method, and the like. The value of the dynamic surface tension may be measured according to a maximum bubble pressure method (for example, with an automatic dynamic surface tensiometer BP-D4, manufactured by Kyowa Interface Science Co., Ltd.). In the measurement of dynamic surface tension by a maximum bubble pressure method, gas is supplied from a gas-supplying source to a probe and a bubble is generated from the tip of the probe immersed in ink. By changing the flowing amount of gas at this time, the generation speed of a bubble may change. The surface tension is measured by the pressure applied to the bubble from the ink that changes with the variation of the flowing amount of gas. When the radius of the bubble becomes equal to the radius of the tip of the probe, the maximum pressure (the maximum bubble) is shown. The surface tension (of the ink at this time is represented by the following equation.

$$\sigma = (\Delta P \cdot r)/2$$

In the equation, r is the radius of the tip of the probe, and $\Delta P$ is the difference between the maximum value and the minimum value of the pressure applied to the bubble. The maximum value of the pressure applied to the bubble is the maximum pressure (the maximum bubble pressure) at the time when the radius of curvature of the bubble is equal to the radius of the tip of the probe. The lifetime is the time from when a bubble separates from the probe after the maximum bubble pressure, a new surface is formed and until when the next maximum bubble pressure is reached.

The dynamic surface tension of a liquid such as ink and the like may be the surface tension by lifetime, which usually is on the order of from several 10 ms to several 1,000 ms. The penetrability of ink into a recording material usually is lower when the dynamic surface tension is higher, so that feathering may be improved. Further, the pigment remains abundantly on the surface of the recording material, so that the OD value also may increase, but the drying property of the ink on the recording material may be reduced, and unevenness in the solid part may occur. These tendencies are particularly conspicuous in second colors such as red, green, blue, and the like. When the dynamic surface tension is lower, the penetrability of ink into the recording material generally is higher, so that feathering may be worsened and the OD value also lowers, but the drying property of the ink on the recording material may be improved, and unevenness in the solid part may be reduced. Incidentally, in general ink-jet recording methods, penetration phenomenon of ink into a recording material may be on the order of several 10 ms.

It has been found that, in the case of the black ink where feathering and OD value are regarded as important as compared with the case of the color inks, printing quality of text data that is little in feathering, high in OD value, and having good drying property to a recording material may be achieved by the use of the black ink having the dynamic surface tension of from about 40 mN/m to about 45 mN/m measured on the condition of 25° C. according to a maximum bubble pressure method at lifetime of 100 ms. Incidentally, when the dynamic surface tension is less than about 40 mN/m, feathering may be conspicuous and the OD value may be liable to lower. When it exceeds about 45 mN/m, the drying property of the ink on the recording material tends to worsen, and also the ejection stability of the ink from an ink jet head may be liable to deteriorate.

Unlike the black ink, the color inks may be often mixed on a recording material as second colors such as red, green, blue and the like, so that unevenness is liable to occur in solid parts. Drying properties of the inks may be increased to avoid unevenness in solid parts. It has been found that printing quality improved while avoiding unevenness in solid parts may be achieved by the use of the color inks having the dynamic surface tension of from about 35 mN/m to about 40 mN/m measured on the condition of 25° C. according to a maximum bubble pressure method at lifetime of 100 ms. Further, it has been found that because the drying property of the color inks to the recording material is improved, bleeding occurring between the black ink and the color inks may be still further improved. When the dynamic surface tension exceeds about 40 mN/m, unevenness in the solid part may be conspicuous, and if it is less than about 35 mN/m, ejection stability from an ink-jet head may decrease.

Suitable examples of pigments are shown below. The pigments for use in the black ink include, but are not limited to, carbon blacks such as MA8 and MA100 (manufactured by Mitsubishi Chemical Corporation), Color Black FW200 (manufactured by Degussa), and the like. The pigments for use in the yellow ink include, but are not limited to, C.I. Pigment Yellow 3, 13, 74, 83, 154, and the like. The pigments for use in the magenta ink include, but are not limited to, C.I. Pigment Red 5, 48, 112, 122, 177, 202, 207, and the like. The pigments for use in the cyan ink include, but are not limited to, C.I. Pigment Blue 15, 15:3, 15:4, 16, 60, and the like.

The amount of the pigment contained in each pigment series ink of the ink set may differ depending upon the desired printing density and color. In general, if the amount of pigment is too little, color developing on a recording material may be insufficient, while when the amount on pigment is too much, clogging of the nozzles of ink-jet heads may occur. The amount of pigment usually ranges from about 0.1 wt % to about 10 wt %, and often ranges from about 1 wt % to about 7 wt %, based on the total weight of each ink.

A dispersant for the pigment may be added to the pigment series ink for the purpose of maintaining dispersion stability. As the dispersants, polymer dispersants, surfactants, and the like are exemplified. The examples of polymer dispersants include, but are not limited to, proteins (e.g., gelatin, albumin, and the like), natural rubbers (e.g., gum arabic, tragacanth gum, and the like), glucosides (e.g., saponin, and the like), cellulose derivatives (e.g., methyl cellulose, carboxy cellulose, hydroxymethyl cellulose, and the like), natural polymer (e.g., lignin sulfonate, shellac, and the like); anionic polymers such as polyacrylate, salt of styrene-acrylic acid copolymer, salt of vinylnaphthalene-acrylic acid copolymer, salt of styrene-maleic acid copolymer, salt of vinylnaphthalene-maleic acid copolymer, sodium salt of β-naphthalenesulfonic acid and formaldehyde polycondensations, phosphate salt of β-naphthalenesulfonic acid and formaldehyde polycondensations, and the like; and nonionic polymers such as polyvinyl alcohol, polyvinyl pyrrolidone, polyethylene glycol, and the like. The examples of surfactants include, but are not limited to, anionic surfactants such as higher alcohol sulfates, liquid fatty oil sulfates, alkylallyl sulfates, and the like; and nonionic surfactants such as polyoxyethylene alkyl ethers, polyoxyethylene alkyl esters, sorbitan alkyl esters, polyoxyethylene sorbitan alkyl esters, and the like. Dispersants may be used alone, or two or more kinds may be used in combination.

According to the kind of pigment and the kind of dispersant, the appropriate amount of dispersant capable of functioning as dispersant may be selected. When the amount of the dispersant is too little, the dispersion stability of the pigment may be insufficient, and when the amount of the dispersant is too much, the viscosity of the ink may increase, which may lead to difficulties in ejection of the ink from ink-jet heads. The amount of the dispersant usually ranges from about 5 wt % to about 50 wt %, and often ranges from about 10 wt % to about 40 wt %, to the pigment. When the dispersant is added to each of pigment series inks, a pigment may be further dispersed with a dispersing apparatus. As the dispersing apparatus used for dispersing pigments, generally used dispersing apparatus may be used with no restriction, for example, a ball mill, a roll mill, a sand mill, and the like are exemplified. A high speed sand mill may be suitable.

Deionized water may be used as water in each ink. The amount of water may vary over a wide range depending upon the kinds and compositions of water-soluble organic solvents used in combination, and desired characteristics of the ink. When the amount of water is too little, the viscosity of the ink may increase, and ejection from ink-jet heads may be difficult. While when the amount of water is too much, precipitation and agglomeration of colorants tend to occur due to evaporation of water content, and clogging of nozzles of ink-jet heads may occur. Given these considerations, the amount usually ranges from about 10 wt % to about 95 wt %, and often ranges from about 10 wt % to about 80 wt %, based on the total weight of each ink.

Water-soluble organic solvents which may be used in each ink are broadly classified into humectants and penetrants. Water-soluble organic solvents used as the humectant may be added to the ink for the purpose of preventing clogging of nozzles of ink-jet heads. Water-soluble organic solvents used as the penetrant may be added to ink in order to penetrate the ink rapidly into a recording material when printed.

The examples of the humectants include, but are not limited to, lower alcohols such as methyl alcohol, ethyl alcohol, n-propyl alcohol, isopropyl alcohol, n-butyl alcohol, sec-butyl alcohol, tert-butyl alcohol, and the like; polyhydric alcohols such as 1,3-butanediol, 1,5-pentanediol, 1,6-hexanediol, glycerin, 1,2,6-hexanetriol, 1,2,4-butanetriol, 1,2,3-butanetriol, pentantriol, and the like; alkylene glycols such as ethylene glycol, diethylene glycol, triethylene glycol, propylene glycol, dipropylene glycol, tripropylene glycol, butylene glycol, thiodiglycol, hexylene glycol, and the like; polyalkylene glycols such as polyethylene glycol, polypropylene glycol, and the like; amide such as formamide, N-methylformamide, N,N-dimethylformamide, dimethylacetamide, and the like; amines such as monoethanolamine, diethanolamine, triethanolamine, monoethylamine, diethylamine, triethylamine, and the like; ketones or keto alcohols such as acetone, diacetone alcohol, and the like; ethers such as tetrahydrofuran, dioxane, and the like; pyrrolidones such as 2-pyrrolidone, N-methyl-2-pyrrolidone, N-hydroxyethyl-2-pyrrolidone, and the like; nitrogen-containing heterocyclic compounds such as 1,3-dimethylimidazolidinone, ε-caprolactam, and the like; sulfur-containing compounds such as dimethyl sulfoxide, sulforan, thiodiethanol, and the like; and the like. Of these humectants, polyhydric alcohols such as alkylene glycol, glycerin, and the like may be particularly suitable. These humectants may be used alone, or two or more kinds may be used in combination.

When the amount of the water-soluble organic solvent as the humectant is too little, the ink may clog nozzles of ink-jet heads. When the amount is too much, the viscosity of the ink generally increases and ejection from ink-jet heads may become difficult. Given these considerations, the amount of the water-soluble organic solvent as the humectant usually ranges from about 5 wt % to about 50 wt %, and often ranges from about 10 wt % to about 40 wt %, based on the total weight of each ink.

Examples of penetrants include, but are not limited to, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, tiethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like. These penetrants may be used alone, or two or more kinds may be used in combination.

When the amount of the water-soluble organic solvent as the penetrant is too low, sufficient penetrability may not be obtained, while when the amount is too high, bleeding such as feathering and the like may occur due to excess penetration. Given these considerations, the amount usually ranges from about 0.1 wt % to about 10 wt %, and often ranges from about 0.5 wt % to about 7 wt %, based on the total weight of each ink.

In addition to the components described above, one or more further additives may be added to the inks, such as a surfactant; a viscosity modifier such as polyvinyl alcohol, polyvinyl pyrrolidone, water-soluble resins, and the like; a surface tension modifier; a mildew proofing agent; an anticorrosive agent; a pH modifier; and the like.

The ink set for ink-jet recording may be manufactured by preparing each ink according to any of known methods, and filling these inks in desired ink cartridges.

When ink-jet recording is performed with the ink set for ink-jet recording, the ink set may be mounted on an ink-jet printer equipped with ink-jet heads. At least one ink of the ink set may be ejected from the ink-jet head toward a recording material according to printing data to form an image on the recording material.

As recording materials, ink-jet heads, and ink-jet printers for use in the ink-jet recording method, those conventionally used in ink-jet recording may be used. For example, as ink-jet heads, piezoelectric ejection type, electrostatic ejection type, and thermal ejection type heads may be used. Ink-jet heads having an ejection nozzle diameter of from about 10 μm to about 50 μm may be used.

EXAMPLE

The following examples are provided only to illustrate certain aspects of the description and are not intended to embody the total scope of the invention or any aspect thereof. Variations of the examples below are intended to be included within the scope of the invention.

Examples 1 to 3 and Comparative Examples 1 to 4

Preparation of Ink Set for Ink-Jet Recording

Black Pigment Ink 1:
Carbon black dispersion was obtained by mixing 20 weight parts of carbon black (MA8, manufactured by Mitsubishi Chemical Corporation), 6 weight parts of ammonium sulfate polyoxyethylene lauryl ether (average degree of polymerization of oxyethylene=12), 10 weight parts of glycerin, and 64 weight parts of water (ion exchange water), and subjecting the resulting mixture to dispersing treatment in a wet type sand mill with zirconia beads having a diameter of 0.3 mm as the dispersion medium. Further, 80 weight parts of an ink solvent was prepared by mixing 54 weight parts of water (ion exchange water), 24 weight parts of glycerin, and 2 weight parts of dipropylene glycol-n-propyl ether. Subsequently, 80 weight parts of the ink solvent prepared was gradually added to 20 weight parts of the carbon black dispersion while stirring, and the mixture was stirred for further 30 minutes, and then filtered through a membrane filter having a pore diameter of 1 μm, whereby ink was prepared. The amount of the carbon black in the total weight of the ink was 4 wt %.

Black Pigment Inks 2 to 6, Yellow Pigment Ink, Magenta Pigment Ink and Cyan Pigment Ink:

Inks each having the ink composition summarized in Tables 1 and 2 were prepared according to the preparation method of the black pigment ink 1. Incidentally, the ink compositions summarized in Tables 1 and 2 are the actual ink compositions contained in the total weight of respective inks represented by wt %.

Each sample solution of the prepared inks was prepared by diluting the ink with water so as to reach the pigment amount of from 0.02 wt % to 0.2 wt %. The volume average particle size (diameter) of the pigment of the obtained sample solution was measured with a dynamic light scattering nanoparticle size analyzer LB-500 (manufactured by Horiba, Ltd.). The results obtained are summarized in Tables 1 and 2.

Each of the inks was measured for the dynamic surface tension with an automatic dynamic surface tensiometer BP-D4 (manufactured by Kyowa Interface Science Co., Ltd.) at 25° C. at lifetime in the range of from 20 to 5,000 ms, and the measured value of dynamic surface tension at lifetime of 100 ms was read. The results obtained are summarized in Tables 1 and 2.

TABLE 1

| | | Black Pigment Ink | | | | | | Yellow Pigment Ink | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Ink Composition (wt %) | Glycerin | 26.0 | 25.0 | 26.5 | 23.0 | 27.0 | 23.0 | 25.0 | 24.0 | 27.0 | 25.0 | 21.0 | 28.0 |
| | Dipropylene glycol-n-propyl ether | 2.0 | 3.0 | 1.5 | 5.0 | 1.0 | 5.0 | 4.0 | 5.0 | 2.0 | 4.0 | 8.0 | 1.0 |
| | Carbon black *1 | 4.0 | 4.0 | 4.0 | 4.0 | 4.0 | 4.0 | — | — | — | — | — | — |
| | C.I. Pigment Yellow 74 | — | — | — | — | — | — | 3.0 | 3.0 | 3.0 | 3.0 | 3.0 | 3.0 |
| | Ammonium sulfate polyoxyethylene lauryl ether *2 | 1.2 | 1.2 | 1.2 | 1.2 | 1.2 | 1.2 | 1.0 | 1.0 | 1.0 | 1.0 | 1.0 | 1.0 |
| | Water (ion exchange water) | Balance | Balance | Balance | Balance | Balance | Balance | Balance | Balance | Balance | Balance | Balance | Balance |
| Volume average particle size (diameter) of pigment (nm) | | 110 | 140 | 115 | 105 | 155 | 85 | 75 | 63 | 80 | 98 | 45 | 102 |
| Dynamic surface tension (mN/m) | | 42.3 | 40.7 | 44.1 | 37.4 | 48.2 | 36.9 | 38.5 | 37.1 | 41.8 | 39.0 | 33.6 | 47.9 |
| Evaluation of ejection stability | | G | G | G | G | NG | G | G | G | G | G | NG | NG |

*1: MA8, manufactured by Mitsubishi Chemical Corporation
*2: Average degree of polymerization of oxyethylene = 12
* Ink composition (wt %) means actual ink composition contained in all the amount of each ink.

TABLE 2

| | | Magenta Pigment Ink | | | | | | Cyan Pigment Ink | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Ink Composition (wt %) | Glycerin | 24.0 | 23.0 | 26.0 | 24.0 | 20.0 | 27.0 | 25.0 | 24.0 | 27.0 | 25.0 | 21.0 | 28.0 |
| | Dipropylene glycol-n-propyl ether | 4.0 | 5.0 | 2.0 | 4.0 | 8.0 | 1.0 | 4.0 | 5.0 | 2.0 | 4.0 | 8.0 | 1.0 |
| | C.I. Pigment Red 122 | 4.0 | 4.0 | 4.0 | 4.0 | 4.0 | 4.0 | — | — | — | — | — | — |
| | C.I. Pigment Blue 15:3 | — | — | — | — | — | — | 3.0 | 3.0 | 3.0 | 3.0 | 3.0 | 3.0 |
| | Ammonium sulfate polyoxyethylene lauryl ether *1 | 1.2 | 1.2 | 1.2 | 1.2 | 1.2 | 1.2 | 1.0 | 1.0 | 1.0 | 1.0 | 1.0 | 1.0 |
| | Water (ion exchange water) | Balance | Balance | Balance | Balance | Balance | Balance | Balance | Balance | Balance | Balance | Balance | Balance |
| Volume average particle size (diameter) of pigment (nm) | | 81 | 73 | 80 | 105 | 41 | 108 | 77 | 62 | 75 | 110 | 54 | 112 |
| Dynamic surface tension (mN/m) | | 38.9 | 36.5 | 41.5 | 39.1 | 34.0 | 48.0 | 38.6 | 37.4 | 42.0 | 38.8 | 33.9 | 48.5 |
| Evaluation of ejection stability | | G | G | G | G | NG | NG | G | G | G | G | NG | NG |

*1: Average degree of polymerization of oxyethylene = 12
* Ink composition (wt %) means actual ink composition contained in all the amount of each ink.

Each ink summarized in Tables 1 and 2 was filled in a desired ink cartridge, and the obtained ink cartridges were combined to constitute the ink set as summarized in Table 3. The resulting ink set was mounted on an ink-jet printer-mounted digital multifunction device (DCP-110C, manufactured by Brother Industries, Ltd.), and evaluation of printing was performed. A text print pattern was formed with each of the black ink, the yellow ink, the magenta ink and the cyan ink on DATA COPY paper (plain paper, manufactured by m-real). Further, a color patch was formed by changing the mixing ratio of the black ink, the yellow ink, the magenta ink and the cyan ink on DATA COPY paper (plain paper, manufactured by m-real) and exclusive paper (photographic glossy paper: BP61GLA, manufactured by Brother Industries, Ltd.). The evaluation was performed as follows.

(a) Evaluation of Ejection Stability:

In forming the text print pattern (on plain paper), the ejecting property of ink was visually observed and evaluated. The results of evaluation are summarized in Tables 1 and 2.

G: Splashes and blank of the inks were not observed on the print sample.

NG: Splashes and blank of the inks were observed on the print sample.

(b) Evaluation of Feathering:

Feathering on the recorded part with the black ink of the text print pattern (plain paper) was visually observed, and evaluated according to the following criteria. The results of evaluation are summarized in Table 3.

AA: Feathering was not observed.

A: Feathering was hardly conspicuous.

B: Feathering was conspicuous and practicably problematic.

C: Feathering was very conspicuous and impracticable.

(c) Evaluation of Bleeding:

Bleeding between the recorded part with the black ink and the recorded part with the yellow ink of the text print pattern (plain paper) was visually observed, and evaluated according to the following criteria. The reason for performing visual observation between the recorded part with the black ink and the recorded part with the yellow ink is that bleeding is most conspicuous in this combination. The results of evaluation are summarized in Table 3.

AA: Bleeding was not observed.

A: Bleeding was hardly conspicuous.

B: Bleeding was conspicuous and practicably problematic.

C: Bleeding was very conspicuous and impracticable.

(d) Evaluation of OD Value

OD value of the recorded part with the black ink of the text print pattern (plain paper) was measured with an RD914 densitometer (manufactured by Gretag Macbeth AG), and evaluated according to the following criteria. The results of evaluation are summarized in Table 3.

AA: OD value was 1.3 or more and apparently good.

A: OD value was 1.1 or more and on a level free from a problem.

C: OD value was less than 1.1 and apparently light in color.

(e) Evaluation of Drying Property

Drying property of the recorded part with the black ink of the text print pattern (plain paper) was evaluated. The recorded part with the black ink was rubbed with fingers 15 seconds after printing, and the worn state of the ink was visually observed and the influence on the image was evaluated according to the following criteria. The results of evaluation are summarized in Table 3.

AA: Wearing out of the ink was not observed.

A: Wearing out of the ink was hardly noticed.

B: Wearing out of the ink was conspicuous and practicably problematic.

C: Wearing out of the ink was very conspicuous and impracticable.

(f) Evaluation of Unevenness in Color Solid Part:

Unevenness in each of the color solid parts recorded with the color inks (the yellow ink, the magenta ink, and the cyan ink) of the color patches (plain paper and glossy paper) was visually observed, and evaluated according to the following criteria. The results of evaluation are summarized in Table 3.

AA: Unevenness in the color solid part was not observed.

A: Unevenness in the color solid part was hardly observed.

B: Unevenness in the color solid part was conspicuous and practicably problematic.

C: Unevenness in the color solid part was very conspicuous and impracticable.

(g) Evaluation of Color Developing Property of Color Inks

Colors of the color patches (glossy paper) were measured with Spectro Scan (light source: $D_{65}$, angle of visibility: 2°) (manufactured by Gretag Macbeth AG). Chroma C* of the measured color was found on the basis of L*a*b* color system (CIE1976 (L*a*b*) color system) normalized by Commission Internationale del'Eclairage (CIE) in 1976. C* was computed according to the following equation (1) with perceived chromaticity indexes (a* and b*, hereinafter they are referred to as a*, b*, respectively) obtained from the measurement. Evaluation was also performed visually, and the color developing property was evaluated according to the following criteria. The results of evaluation are summarized in Table 3.

$$C^* = \sqrt{(a^*)^2 + (b^*)^2} \qquad (1)$$

AA: A clear color developing property was shown.

A: There was no problem in a color developing property.

B: There was a little problem in a color developing property and practicably problematic.

C: There was apparently a problem in a color developing property and impracticable.

TABLE 3

|   |   |   |   | Example | | | Comparative Example | | | |
|---|---|---|---|---|---|---|---|---|---|---|
|   |   |   |   | 1 | 2 | 3 | 1 | 2 | 3 | 4 |
| Ink set | Black ink |   |   | 1 | 2 | 3 | 4 | 5 | 6 | 5 |
|   | Yellow ink |   |   | 1 | 2 | 1 | 3 | 4 | 5 | 6 |
|   | Magenta ink |   |   | 1 | 2 | 1 | 3 | 4 | 5 | 6 |
|   | Cyan ink |   |   | 1 | 2 | 1 | 3 | 4 | 5 | 6 |
| Evaluation | Plain | Feathering | Black ink recorded part | AA | A | AA | C | AA | C | AA |
|   | paper | Bleeding | Black ink recorded part and | A | AA | A | B | B | B | C |

TABLE 3-continued

|  |  |  |  | Example | | | Comparative Example | | | |
|---|---|---|---|---|---|---|---|---|---|---|
|  |  |  |  | 1 | 2 | 3 | 1 | 2 | 3 | 4 |
|  |  |  | yellow ink recorded part |  |  |  |  |  |  |  |
|  | OD value |  | Black ink recorded part | AA | AA | AA | A | AA | C | AA |
|  | Drying property |  | Black ink recorded part | AA | AA | A | AA | C | AA | C |
|  | Unevenness in the color solid part |  | Color ink recorded parts | A | AA | A | C | B | AA | C |
| Glossy paper | Color developing property of color inks | Chroma C* | Yellow | 92 | 90 | 92 | 91 | 89 | 90 | 88 |
|  |  |  | Magenta | 74 | 73 | 74 | 72 | 70 | 65 | 68 |
|  |  |  | Cyan | 64 | 63 | 64 | 63 | 62 | 59 | 58 |
|  |  |  | Red | 66 | 65 | 66 | 62 | 60 | 61 | 56 |
|  |  |  | Green | 43 | 45 | 43 | 41 | 35 | 42 | 34 |
|  |  |  | Blue | 63 | 60 | 63 | 60 | 58 | 53 | 55 |
|  |  |  |  | AA | AA | AA | A | C | B | C |
|  | Unevenness in the color solid part |  |  | A | AA | A | B | A | AA | B |

In the case of the ink set in Example 1, the dynamic surface tensions of the color inks are 38 mN/m or so, which was a little high, so that evaluations of unevenness in the color solid parts (plain paper and glossy paper) and bleeding were graded "A", but other evaluation items were all graded "AA".

In the case of the ink set in Example 2, the dynamic surface tension of the black ink was a value approaching 40 mN/m, so that evaluation of feathering of the black ink recorded part alone was graded "A", but other evaluation items were all graded "AA".

In the case of the ink set in Example 3, the dynamic surface tension of the black ink was 44 mN/m or so, which was a little high, so that evaluations of drying property of the black ink recorded part and unevenness in the color solid parts (plain paper and glossy paper) were graded "A". Further, in addition to the black ink, the dynamic surface tensions of the color inks were a little high, so that evaluation of bleeding was graded "A", but other evaluation items were all graded "AA".

On the other hand, in the case of the ink set in Comparative Example 1, the dynamic surface tension of the black ink was less than 40 mN/m, so that evaluation of feathering of the recorded part with the black ink was graded "C". Further, the dynamic surface tensions of the color inks exceeded 40 mN/m, so that evaluation of bleeding was graded "B", and unevenness in the color solid parts (plain paper and glossy paper) was graded "B" or "C".

In the case of the ink set in Comparative Example 2, the dynamic surface tension of the black ink exceeds 45 mN/m, so that evaluation of drying property of the recorded part with the black ink was graded "C". Further, because the average particle size (diameter) of the pigment in the black ink exceeded 150 nm, evaluation of ejection stability of the black ink graded "NG". In addition, the average particle sizes (diameters) of the pigments in the color inks exceeded 90 nm, so that evaluations of unevenness in the color solid parts (plain paper) was graded "B", and color developing property of the color inks were graded "C".

In the case of the ink set in Comparative Example 3, the average particle size (diameter) of the pigment in the black ink was less than 100 nm and the dynamic surface tension of the black ink was also less than 40 mN/m, so that evaluations of feathering of the recorded part with the black ink and OD value of the recorded part with the black ink were graded "C". Further, because the dynamic surface tensions of the color inks were less than 35 mN/m, evaluations of ejection stabilities of the color inks were graded "NG". In addition, the average particle sizes (diameters) of the color ink pigments were less than 60 nm, so that both evaluations of color developing property of the color inks (glossy paper) and bleeding were graded "B".

In the case of the ink set in Comparative Example 4, because the dynamic surface tension of the black ink exceeded 45 mN/m, evaluation of drying property of the recorded part with the black ink was graded "C". In addition to this, because the average particle size (diameter) of the pigment in the black ink exceeded 150 nm, evaluation of ejection stability of the black ink graded "NG". The dynamic surface tensions of the color inks were high values such as 48 mN/m or so, so that the ejection stabilities of the color inks were graded "NG". In addition, the average particle sizes (diameters) of the color ink pigments exceeded 90 nm, so that evaluations of unevenness in the color solid parts with plain paper was graded "C" and that with glossy paper was graded "B", and color developing property of the color inks (glossy paper) was graded "C". Further, the dynamic surface tension was high with the black ink and the color inks, so that evaluation of bleeding was graded "C".

The invention is not limited to the embodiments described in the Examples, which are provided for illustrative purposes only. The material substances, their amounts used, and the conditions of producing them may be varied and modified without departing from the spirit and the scope of the invention as described and claimed herein.

What is claimed is:

1. An ink set for ink-jet recording comprising a black ink comprising a black pigment, a yellow ink comprising a yellow pigment, a magenta ink comprising a magenta pigment, and a cyan ink comprising a cyan pigment, wherein an average particle size of the black pigment is from about 100 nm to about 150 nm, and an average particle size of each of the yellow pigment, the magenta pigment and the cyan pigment is from about 60 nm to about 90 nm, and wherein a dynamic surface tension of the black ink is from about 40 mN/m to about 45 mN/m, and a dynamic surface tension of each of the yellow ink, the magenta ink and the cyan ink is from about 35 mN/m to about 40 mN/m measured on the condition of 25° C. according to a maximum bubble pressure method at lifetime of 100 ms.

2. The ink set according to claim 1, wherein the average particle size of the black pigment is from about 120 nm to about 150 nm.

3. The ink set according to claim 1, wherein the average particle size of the yellow pigment is from about 60 nm to about 75 nm.

4. The ink set according to claim 1, wherein the average particle size of the magenta pigment is from about 60 nm to about 75 nm.

5. The ink set according to claim 1, wherein the average particle size of the cyan pigment is from about 60 nm to about 75 nm.

6. The ink set according to claim 1, wherein the dynamic surface tension of the black ink is from about 40 mN/m to about 43 mN/m.

7. The ink set according to claim 1, wherein the dynamic surface tension of the yellow ink is from about 36 mN/m to about 38 mN/m.

8. The ink set according to claim 1, wherein the dynamic surface tension of the magenta ink is from about 36 mN/m to about 38 mN/m.

9. The ink set according to claim 1, wherein the dynamic surface tension of the cyan ink is from about 36 mN/m to about 38 mN/m.

10. The ink set according to claim 1, wherein the amount of black pigment ranges from about 0.1 wt % to about 10 wt %, based on the total weight of the black ink.

11. The ink set according to claim 1, wherein the amount of yellow pigment ranges from about 0.1 wt % to about 10 wt %, based on the total weight of the yellow ink.

12. The ink set according to claim 1, wherein the amount of magenta pigment ranges from about 0.1 wt % to about 10 wt %, based on the total weight of the magenta ink.

13. The ink set according to claim 1, wherein the amount of cyan pigment ranges from about 0.1 wt % to about 10 wt %, based on the total weight of the cyan ink.

14. The ink set according to claim 1, wherein the black pigment is a carbon black.

15. The ink set according to claim 1, wherein the yellow pigment is selected from the group consisting of C.I. Pigment Yellow 3, C.I. Pigment Yellow 13, C.I. Pigment Yellow 74, C.I. Pigment Yellow 83, C.I. Pigment Yellow 154, and combinations thereof.

16. The ink set according to claim 1, wherein the magenta pigment is selected from the group consisting of C.I. Pigment Red 5, C.I. Pigment Red 48, C.I. Pigment Red 112, C.I. Pigment Red 122, C.I. Pigment Red 177, C.I. Pigment Red 202, C.I. Pigment Red 207, and combinations thereof.

17. The ink set according to claim 1, wherein the cyan pigment is selected from the group consisting of C.I. Pigment Blue 15, C.I. Pigment Blue 15:3, C.I. Pigment Blue 15:4, C.I. Pigment Blue 16, C.I. Pigment Blue 60, and combinations thereof.

18. An ink-jet recording method comprising mounting the ink set for ink-jet recording according to claim 1 on an ink-jet printer equipped with ink-jet heads, and ejecting at least one ink constituting the ink set from the ink-jet head to a recording material according to printing data to form an image on the recording material.

* * * * *